United States Patent [19]

Moertel

[11] 4,268,474
[45] May 19, 1981

[54] METHOD OF MOLDING USING A MOLDING WHEEL AND FLEXIBLE BELT

[75] Inventor: George B. Moertel, Conneautville, Pa.

[73] Assignee: Textron, Inc., Providence, R.I.

[21] Appl. No.: 107,759

[22] Filed: Dec. 27, 1979

Related U.S. Application Data

[63] Continuation of Ser. No. 826,542, Aug. 22, 1977, abandoned.

[51] Int. Cl.³ .......................... B29D 5/00; B29C 5/00
[52] U.S. Cl. .................................. 264/252; 164/434; 264/254; 264/297; 264/328.7; 425/115; 425/545; 425/814
[58] Field of Search ............... 264/252, 297, 328, 254; 425/115–117, 128, 121, 122, 129 R, 224, 233, 335, 363, 542, 574, 581, 588, 814, 572, 547, 817, DIG. 34; 164/98, 433, 434

[56] References Cited

U.S. PATENT DOCUMENTS

| | | | |
|---|---|---|---|
| 2,206,930 | 7/1940 | Webster | 164/433 |
| 2,511,402 | 6/1950 | Firing | 264/252 |
| 2,928,148 | 3/1960 | Porterfield | 164/433 |
| 3,454,984 | 7/1969 | Alberts | 425/545 |
| 3,999,914 | 12/1976 | Breher et al. | 425/115 |

FOREIGN PATENT DOCUMENTS 533711  9/1941  United Kingdom .

*Primary Examiner*—W. E. Hoag
*Attorney, Agent, or Firm*—O'Brien and Marks

[57] ABSTRACT

A continuous flexible metal band surrounding a molding wheel and rotating therewith engages the wheel through an arc less than 180°, e.g. 110°, and is maintained with a substantial inward radius of curvature throughout its entire length. This permits the employment of bands with cavities therein and having thicknesses several times greater than 0.001 times the diameter of the molding wheel without fatigue and failure of the band.

7 Claims, 8 Drawing Figures

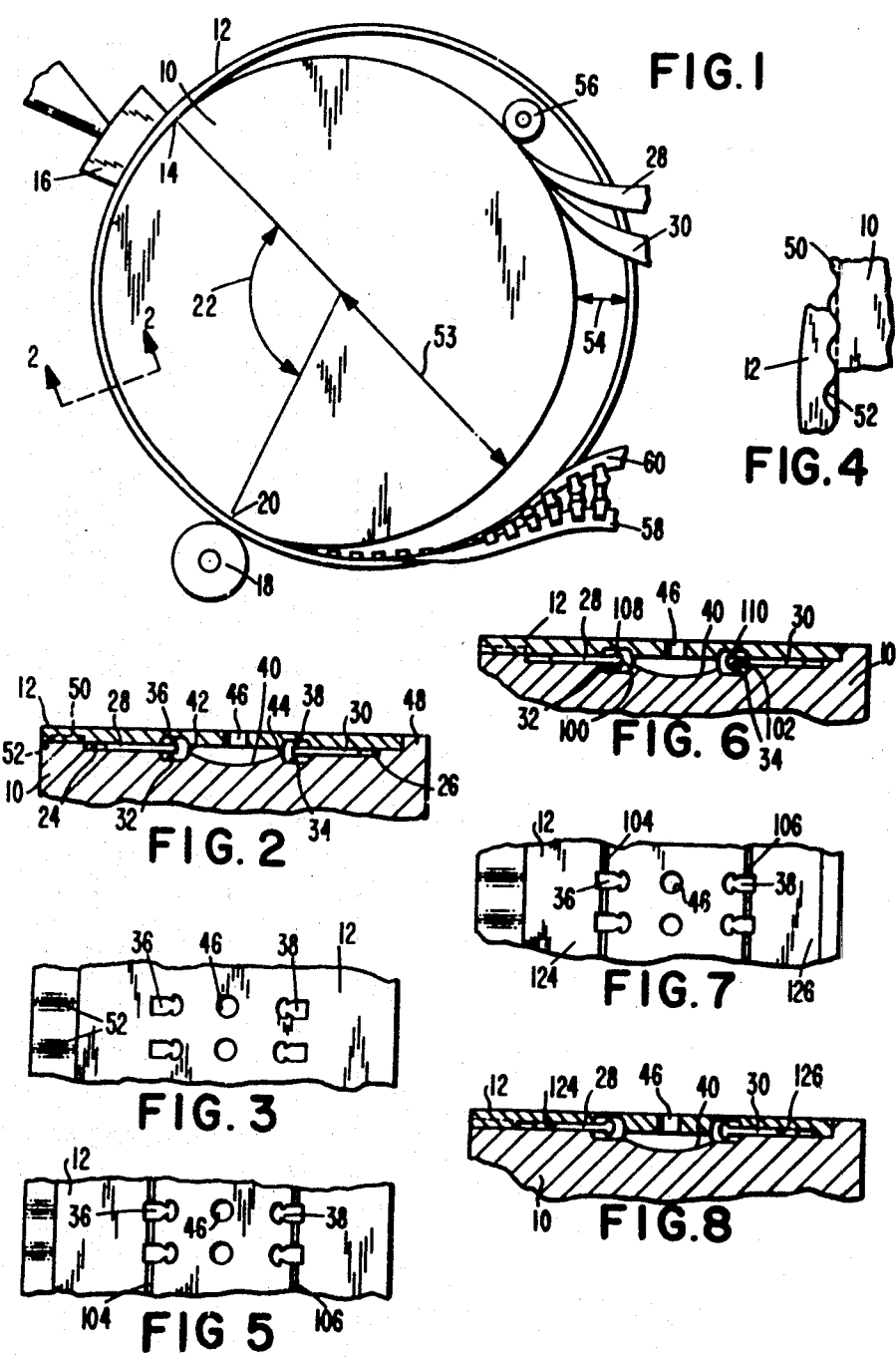

METHOD OF MOLDING USING A MOLDING WHEEL AND FLEXIBLE BELT

CROSS-REFERENCE TO RELATED APPLICATION

This application is a continuation application of copending application Ser. No. 826,542 filed Aug. 22, 1977, now abandoned.

BACKGROUND OF THE INVENTION

1. Field of the Invention

This invention relates to the continuous molding of polymer elements, such as thermoplastic slide fastener elements.

2. Description of the Prior Art

The prior art contains a number of apparatus and processes for continuous molding of thermoplastic elements such as slide fastener elements on the edge of a continuous tape. U.S. Pat. No. 2,511,402 discloses such an apparatus including a drum member having cavities arranged on the periphery thereof with a noncircular annular member having cavities cooperating with the cavities in the drum member to form complete element cavities for molding elements on the edge of a tape positioned between the drum and annular member. There are a number of flexible strong metal materials, such as certain stainless steels, which can be employed for forming flexible belts or bands enclosing mold cavities in the periphery of a cavity wheel; however these bands have been limited to a maximum thickness generally about 0.001 times the diameter of the wheel since greater thicknesses heretofore have been subject to fatigue and breakage of the band after a relatively short period of use. When cavities are formed in the band, the band must have a sufficient thickness to accommodate such cavities. The formation of symmetrical slide fastener elements by molding directly on the edge of a tape requires cavities in the band of such depth, e.g. 0.15 centimeter in a band of 0.2 centimeter thickness, that a wheel with a very large diameter, e.g. two meters, would be necessitated to permit the use of a continuous molding apparatus employing a band and molding wheel; such large diameter molding wheels and consequently long bands would require a great deal of effort and expense to manufacture.

SUMMARY OF THE INVENTION

The invention is summarized in a method of continuously molding polymer elements including the steps of simultaneously rotating in the same direction a cylindrical molding wheel and a continuous flexible metal band which has a thickness substantially greater than 0.001 times the diameter of the molding wheel and which encircles the molding wheel, forcing the flexible metal band against the periphery of the molding wheel between a stationary engaging point and a stationary disengaging point as the molding wheel and the flexible metal band rotate from the engaging point to the disengaging point wherein the engaged portion of the wheel periphery at all times extends substantially less than one-half of the circumference of the molding wheel with the band being spaced from the remaining portion of the wheel periphery, injecting molten polymer material after the engaging point into cavity means formed between the metal band and the molding wheel with at least a portion of the cavity means formed in the metal band, solidifying the polymer within the cavity means after injection but prior to reaching the disengaging point to form solid elements, removing the solid elements after passing the disengaging point, and maintaining the flexible metal band with a substantial inward radius of curvature equal to or greater than the molding wheel throughout every point thereof.

An object of the invention is to provide improved and less costly techniques in continuous molding of polymer articles.

Another object of the invention is to utilize a metal band enclosing a portion of a molding wheel wherein the band has a thickness several times greater than 0.001 times the wheel diameter.

It is also an object of the invention to eliminate fatique and failure of bands engaging molding wheels.

One advantage of the invention is that cavitities with sufficient depth can be formed in a band engaging a molding wheel to mold fastening elements without the neccessity of the molding wheel having a large diameter and the band having a long length.

One feature of the invention is the maintenance of a band in a continuous inward curved state without passing through a flat state or outward curved state to reduce bending and fatigue and resultant failure of the band.

Other objects, advantages, and features of the invention will be apparent from the description of the preferred embodiment taken in conjunction with the accompanying drawings.

BRIEF DESCRIPTION OF THE DRAWINGS

FIG. 1 is a side elevation view of an apparatus for molding coupling elements on the edge of a continuous tape in accordance with the invention.

FIG. 2 is a cross section view of a portion of the apparatus of FIG. 1 taken at line 2—2 in FIG. 1.

FIG. 3 is a bottom view of a portion of a band of the apparatus of FIG. 1.

FIG. 4 is an enlarged side view of a portion of the band mating with the cavity wheel of FIG. 1.

FIG. 5 is a bottom view of a portion of a modified band in accordance with the invention.

FIG. 6 is a cross section view of the modified band of FIG. 5 with a corresponding modified portion of a cavity wheel.

FIG. 7 is a bottom view of still another modified band portion in accordance with the invention.

FIG. 8 is a cross section view of the modified band portion of FIG. 7 together with another corresponding modified cavity wheel portion in accordance with the invention.

DESCRIPTION OF THE PREFERRED EMBODIMENTS

A molding apparatus, illustrated in FIG. 1 and employed in accordance with the invention, includes a cylindrical molding or cavity wheel 10 and an annular band or flexible member 12 encircling the wheel 10. Both the wheel 10 and the band 12 are rotated in a counter clockwise direction as viewed in FIG. 1. The band 12 is forced against the cavity wheel at a stationary engaging point 14 by an injection shoe 16 of a thermoplastic injection apparatus biased against the outside of the band 12. A band drive wheel 18 engages the outside of the band at a stationary disengaging point 20 to hold the band 12 continually against the wheel 10 during rotation from point 14 to point 20 through an angle 22 of engagement. After the disengaging point 20 the band 12 is maintained spaced from the periphery of the wheel 10 until rotated back to the engaging point 14.

As shown in FIG. 2, the cavity wheel 10 has a pair of annular channels 24 and 26 formed around the periphery of the wheel 10 for receiving respective carrier tapes 28 and 30. A plurality of cavity means includes a pair of rows of cavity portions 32 and 34 formed in the periphery of the cavity wheel 10 and spaced along the inner edges of the channels 24 and 26 together with corresponding rows of cavity portions 36 and 38, see also FIG. 3, formed in the inside of band 12 for mating with the cavity portions 32 and 34 to form cavities having the shape of slide fastener elements to be molded on the inner edges of the tapes 28 and 30. The wheel 10 also has a plurality of runner channels 40 spaced around the periphery of the wheel 10 and extending between the cavity portions 32 and 34 with narrow neck or gate portions 42 and 44 opening into the cavity portions 32 and 34. Holes or openings 46 are formed through the central portion of the band 12 spaced along its length for communicating between the center portions of the respective channels 40 and the injection shoe 16 to permit passage of pressurized molten thermoplastic material into the channels 40 and hence into the cavities 32, 34, 36 and 38.

The wheel 10 has an annular rim 48 at one side thereof forming an edge guide for one edge of the band 12. At the other side of the wheel 10, as shown in FIG. 4, there are a plurality of undulations or projections 50, forming teeth for mating or meshing with similar undulations or depressions 52 formed in the band 12. The projections 50 and depressions 52 have the same spacing as the cavities 32, 34, 36 and 38 around the respective wheel 10 and band 12 so as to bring about and maintain registration of the cavities 36 and 38 of the band 12 with cavities 32 and 34 in the wheel 10. The wheel 10 is formed by conventional machining techniques from a suitable metal such as normally employed in molding dies.

The band 12 is formed from a commercially available flexible resilient sheet or strip of metal such as a stainless steel including 17% chromium, 4% nickel, 4% copper and 75% iron with other possible constituents, or a stainless steel including 17% chromium, 7% nickel and 76% iron with other possible constituents. One suitable material is ARMCO specialty steel 17-4 ph from Armco Steel Corporation and identified as meeting specifications ASTM A693 and AMS 5604. The band material has a thickness suitable to accommodate the cavities 36 and 38 and is formed by conventional techniques into the band 12. The band material thickness is selected substantially greater than 0.001 times the diameter of the wheel 10 and preferably several times 0.001 times the diameter of wheel 10 or greater than 0.002 times the diameter of the wheel so that the diameter of the wheel and the length of the band 12 can be kept to a minimum.

The band 12 is maintained with a continuous inward radius of curvature which is equal to or greater at all points to the radius 53 of the wheel 10 without any portions thereof becoming straight and without any outward radius of curvature. Additionally the band 12 must have a length greater than the circumference of the wheel 10 to produce a space 54 between the band 12 and wheel 10 during rotation from point 20 to point 14; this space 54 must be sufficient to permit the insertion of the tapes 28 and 30 and the laying of the tapes 28 and 30 by roller means 56 in the channels 24 and 26 as well as to permit the removal of stringers 58 and 60 consisting of the tapes 28 and 30 with the molded coupling elements thereon from the cavity wheel 10 and band 12. For such band lengths the angle 22 of engagment between points 14 and 20 generally must be substantially less than 180°, is preferably less than 160°, and is especially preferably less than 120°; otherwise the band 12 would have straight portions and possibly portions with outward radii of curvature. Further, the angle 22 of engagement must be sufficient to permit injection and solidification of the polymer in the cavities 32, 34, 36 and 38 while the band 12 engages the wheel 10. Generally the band 12 should have a length in the range from 5% to 30% longer than the circumference of the wheel 10. Shorter lengths of band 12 relative to the circumference of wheel 10 permit larger angles 22 of engagement while longer lengths of band 12 relative to the circumference of wheel 10 require smaller angles 22 of engagement. Thus it is preferred to have the length of the band 22 less than 25% larger than the circumference of the wheel 10 to permit a larger angle 22 of engagement allowing employment of a relatively small wheel 10 and short band 12. Also bands 12 having relatively lesser thicknesses permit longer bands and/or greater angles 22 of engagement; but the minumum thickness of the band is determined by the required depth for the cavities 36 and 38 plus an allowance necessary for proper machining and normal variation during forming of the cavities.

In an example of a cavity wheel and band in accordance with the invention, the cavity wheel 10 has a diameter of 40.64 centimeters (16 inches) the band 12 has a thickness of 0.198 centimeters (0.078 inches), the cavities 36 and 38 are machined to a depth of 0.146 centimeter (0.0575 inches), the angle 22 between points 12 and 20 is 110°, and the length of the band 12 is selected to produce a spacing 54 of 4.445 centimeter (1.75 inches) between the wheel 10 and band 12 on the side where spaced apart.

In use or operation of the apparatus shown in FIGS. 1-4 the wheel 10 and band 12 are simultaneously rotated counter clockwise. The band 12 is forced against the outer periphery of the wheel 10 at point 14 and is maintained against the periphery of the wheel 10 from point 14 to point 20 by the force of the band drive wheel 18. The tapes 28 and 30 are fed into the respective channels 28 and 30 in the wheel 10 prior to the engagement of the band 12 with the wheel 10 at point 14. Molten thermoplastic polymer is injected from the thermoplastic injection means via injection shoe 16 through the openings 46 in the band 12 into the channels 40 and hence into cavities 32, 34, 36 and 38 formed between the band 12 and the wheel 10 and around the inner edges of the tapes 28 and 30. After injection adjacent to the engaging point 14 the molten polymer is solidified within the cavities to form solid coupling elements secured on the inner edges of the tapes 28 and 30. After solidification of the polymer to form solid coupling elements, the band 12 is disengaged from the wheel 10 at point 20. Thereafter the stringers 58 and 60 including the tapes 28 and 30 with the molded coupling elements on the inner edges thereof are removed from the injection molding apparatus and passed on for further processing, such as severing of the runners connecting the elements and pull-up of the stringers 58 and 60 to form a slide fastener chain.

It has been discovered that the maintenance of a substantial continuous inward radius of curvature in the band 12 equal to or greater than the radius of the wheel 10 throughout all points thereof, permits the employment of a metal band 12 having a thickness substantially greater than 0.001 times the diameter of the wheel 10 without failure due to fatigue and stress on the band 12. Previously it had been believed that metal bands having a thickness greater than 0.001 times the diameter of the wheel would be subject to fatigue and failure due to stress on the band. However by maintaining a substantial and continuous inward radius of curvature in the band 12, a substantial reduction in the size and cost of a cavity wheel and a band used for continuous molding is made possible.

The cavity wheel 10 and the band 12 described above contain two channels and two rows of mating cavities for molding two continuous stringers of a slide fastener; however, the cavity wheel and band can be constructed with only one channel and one row of cavities for forming only one stringer, or the cavity wheel and band may be constructed with more than two channels and two rows of cavities for forming more than two stringers. Additionally the above embodiment is described for molding coupling elements into inner edges of continuous tapes; however the present invention could also be used for molding other articles such as elongated elements on connecting threads as disclosed in my U.S. Applications Ser. No. 601,787 filed Aug. 4, 1975 and Ser. No. 659,881 filed Feb. 20, 1976.

A modification of the apparatus for molding elements on the edge of the tape is illustrated in FIGS. 5 and 6 and includes grooves 100 and 102 formed in the periphery of the cavity wheel together with grooves 104 and 106 formed in the inside surface of the band 10 intersecting the respective cavity portions 32, 34, 36 and 38. The grooves 100 and 104 mate to form a channel or passageway for receiving a bead 108 of the tape 28 while the grooves 102 and 106 mate to form a passageway for receiving a bead 110 of the tape 30. The beads 108 and 110 on the inner edges of the tapes 28 and 30 provide for a stronger support of the coupling elements on the tapes.

Another modification of the apparatus for forming molded coupling elements on the edges of the tapes is illustrated in FIGS. 7 and 8. In this modification, channels 124 and 126 for receiving the tapes 20 and 22 are formed on the inside surface of the band 12 in place of the channels 24 and 26 in the wheel 10 of the apparatus of FIG. 2.

Since the invention is subject to many modifications, variations, and changes in detail, it is intended that all matter in the foregoing description or shown in the accompanying drawings be interpreted as illustrative and not in a limiting sense.

What is claimed is:

1. A method of continuously molding polymer elements comprising the steps of
    simultaneously rotating in the same direction a cylindrical molding wheel and a continuous flexible steel band which has a thickness greater than 0.002 times the diameter of the molding wheel and which encircles the molding wheel,
    continuously engaging the flexible steel band against a portion of the periphery of the molding wheel between an engaging point and a disengaging point as the molding wheel and the flexible steel band rotate from the engaging point to the disengaging point wherein the engaged portion of the wheel periphery at all times is less than a 160° arcuate portion of the circumference of the molding wheel with the band being spaced from the remaining portion of the wheel periphery,
    injecting molten polymer material after the engaging point into cavity means formed between the steel band and the molding wheel with at least a portion of the cavity means formed in the metal band,
    solidifying the polymer within the cavity means after injection but prior to reaching the disengaging point to form solid elements,
    removing the solid elements after passing the disengaging point, and
    maintaining the flexible steel band with a substantial inward radius of curvature equal to or greater than the molding wheel radius throughout every point of the band,
    said maintaining including preventing the steel band from becoming straight at any point thereof, and preventing the steel band from having an outward radius of curvature at any point thereof.

2. A method as claimed in claim 1 wherein the engaged portion of the wheel periphery is maintained at all times less than a 120° arcuate portion of the circumference of the molding wheel.

3. A method as claimed in claim 1 wherein the steel band has a length less than 30% greater than the circumference of the molding wheel.

4. A method as claimed in claim 1 wherein the elements being molded are coupling elements for a slide fastener.

5. A method as claimed in claim 4 wherein the molten polymer is first injected into runner channels between the molding wheel and the band, and the molten polymer flows from opposite ends of each runner channel into a pair of cavities in respective rows of cavities formed between the band and the molding wheel.

6. A method as claimed in claim 4 including the step of feeding continuous connecting means prior to the engaging point into channel means formed between the molding wheel and the steel band and intersecting the cavity means to thus form slide fastener coupling elements joined by the connecting means.

7. A method as claimed in claim 6 wherein the connecting means is a support tape and the coupling elements are molded on one edge of the support tape.

* * * * *